United States Patent [19]
Becker et al.

[11] Patent Number: 5,181,454
[45] Date of Patent: Jan. 26, 1993

[54] SYSTEM FOR DECANTING MATERIAL IN TOWER-TYPE MALTHOUSES

[75] Inventors: Karl L. Becker; Francesco Beldevere, both of Madrid, Spain

[73] Assignees: Seeger Industrial S.A., Madrid, Spain; Inamex de Cerveza y Malta, S.A. de C.V., Texoco, Mexico

[21] Appl. No.: 676,766

[22] Filed: Mar. 27, 1991

[30] Foreign Application Priority Data

Mar. 30, 1990 [ES] Spain ............... 9000922

[51] Int. Cl.⁵ .................... C12C 1/14; C12C 1/06
[52] U.S. Cl. .................... 99/277.2; 435/304; 435/305
[58] Field of Search ............ 99/276, 277, 277.1, 99/277.2, 278; 435/304, 305, 306, 307

[56] References Cited

U.S. PATENT DOCUMENTS

| | | | |
|---|---|---|---|
| 2,933,435 | 4/1960 | Graff et al. | 435/304 |
| 3,849,255 | 11/1974 | Schlimme et al. | 435/304 |
| 4,277,505 | 7/1981 | Simpson | 435/305 |
| 4,286,065 | 8/1981 | Kaluniants et al. | 435/304 |

*Primary Examiner*—Harvey C. Hornsby
*Assistant Examiner*—Reginald L. Alexander
*Attorney, Agent, or Firm*—McAulay Fisher Nissen Goldberg & Kiel

[57] ABSTRACT

A tower-type malthouse is disclosed having floorage areas for steeping, gemination and/or roasting of product. A plurality of separate vertical columns is disposed about the axis of the malthouse and collectively defines therebetween a central space extending vertically through the various floorage areas for passage of product therethrough. Passageways extend radially from the central space to provide communication between the space and the various floorage areas. A movable plug is disposed for axial movement along the columns to selectively open or close the passageways and dispense product to the desired floorage area.

9 Claims, 4 Drawing Sheets

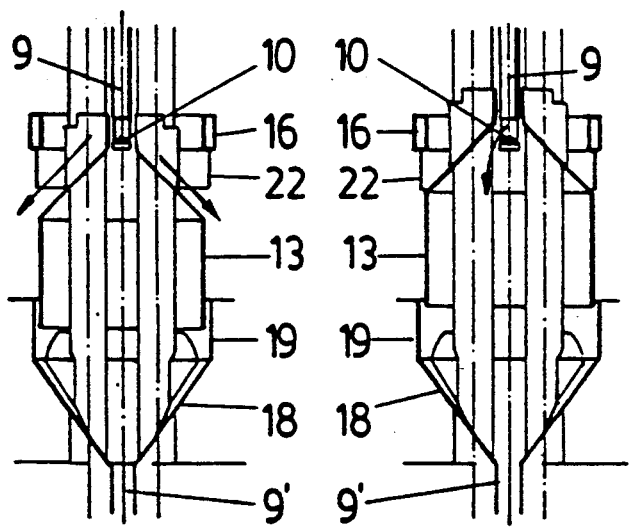
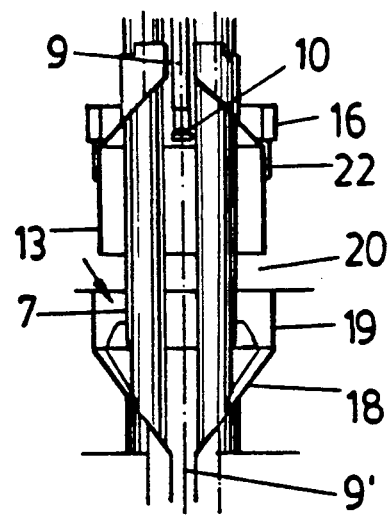
FIG.-4A  FIG.-4B  FIG.-4C

SYSTEM FOR DECANTING MATERIAL IN TOWER-TYPE MALTHOUSES

DESCRIPTION

Subject of the Invention

The present invention relates to a new system for decanting material in tower-type malthouses, that is to say in malthouses in which a plurality of floors is installed, in particular one or more upper steeping floors, one or more intermediate germination floors and one or more lower roasting floors, the said system being in particular directed at the decanting of material between the said floors.

BACKGROUND OF THE INVENTION

As is clear, in malthouses of this type it is necessary for the material, in particular the barley, to pass from the corresponding upper feed hopper to the upper steeping floor and directly to other steeping floors in the event that there is more than one. In a similar way, the material must also pass from these steeping floors directly to various germination floors and finally the same thing occurs from these germination floors to the lower roasting floors, in such a way that sometimes the material passes from one floor to the immediately lower one, while other times it must make a "jump" of two or more floors.

On the other hand there are malthouses in which, due to the diameter of the previously mentioned chambers or floors and for structural cost reasons, it is indispensable to make use of a strong central column which supports the flooring units of the various floors and on which rotates, in its turn, the conventional machine-arm which, disposed radially, is charged with spreading the material over the entire surface of the floor during the loading operation of same, and gathering it towards the central column during the unloading operation, with the help of an endless belt suitably linked up to the said machine-arm.

In such cases and in accordance with the conventional systems for loading operations a revolving channel is installed above which a fixed paddle operates, or vice versa, in order to dispense the product into a gutter which moves with the said machine, while the unloading is accomplished with the help of an annular window in a hollow column provided with radial partitions and aided by a cylindrical hatch which enables the opening or closing of the said window.

The disadvantages that this rotating conveyor system presents essentially center around the cleansing aspect, since there always remain grain residues which germinate and grow, for which reason it is indispensable to have access to the pipework installed inside the hollow column in which consequently a "manhole" must be installed, with the consequent weakening of the said column in addition to the problems of maintenance and the parallel increase in cost that this implies.

DESCRIPTION OF THE INVENTION

With the decanting system which the invention proposes, this problem area is resolved entirely satisfactorily resulting in the decanting being carried out under optimal conditions and with no possibility whatsoever of the occurrence of residual material deposits, resulting in the said "self-cleansing" installation.

For this purpose and more specifically, the invention centers around the substitution of the generally cylindrical and in any even single-piece conventional central column by a multiple column, in particular based on two, three, four or more columns in the strict sense, physically independent of one another and which in any event make up a "passage" or empty space corresponding with the vertical axis of the malthouse, that is to say with the axis of the imaginary column which they form as a whole.

On the basis of this multi-part construction for the column on which a ring is installed at a height suitable for rotation of the machine-arm, provision has been made for installing a plug, based on a lower cylindrical section and an upper conical section, below the said ring, a plug which is crossed by the multi-part column and which includes a quadrangular orifice corresponding with its vertex. This plug can be moved vertically using appropriate raising means, and a deflector which takes on the shape of a quadrangular pyramid, able to finish off and close the orifice of the conical section of the plug, cooperates with it, the said deflector being linked up to a duct for dropping the product from the upper floor, using arms which determine wide lateral windows, in such a way that in this deflector position, closing the orifice of the plug, the product which drops through the upper duct and impinges on the said deflector changes its path towards the floor in which this mechanism is to be found located, passing through the wide spaces defined between the columns.

However, when the said plug ascends the deflector penetrates substantially inside it in such a way that the lateral windows of the duct for dropping the product open into the hollow interior of the said plug and through the latter, and with the aid of an inverted cone installed underneath and following the said plug, the product passes directly to another floor in which, in its turn, the construction described is repeated.

According to another of the characteristics of the invention this lower inverted cone extends upwards in a cylindrical section inside which the cylindrical section of the plug telescopes leaving the mouth of the first cylindrical section situated level with the plane for receiving the product in the floorage area of floor in which the mechanism is located; in such a way that when the plug undergoes a second ascent phase, determining an even greater elevation, a perimetric window is created between the lower mouth of the plug and the upper mouth of the inverted cone, which enables the product to drop from the floorage area or floor in which the mechanism is installed to any of the lower floorage areas, depending on the position which the mechanisms of these latter occupy.

DESCRIPTION OF THE DRAWINGS

In order to complement the current description and with the aim of helping a better understanding of the characteristics of the invention, there is attached to the present descriptive document, as an integral part of the same, a set of drawings in which, by way of nonlimiting example, the following is represented:

FIGS. 4A, 4B and 4C show schematic representations of the assembly represented in FIG. 1, in three distinct operating phases, that of loading the product onto the same floorage area in which the mechanism is located, that of passing the said product to a lower floorage area and that of unloading the product present in the said floorage area of the mechanism.

PREFERRED EMBODIMENT OF THE INVENTION

Figure 1:
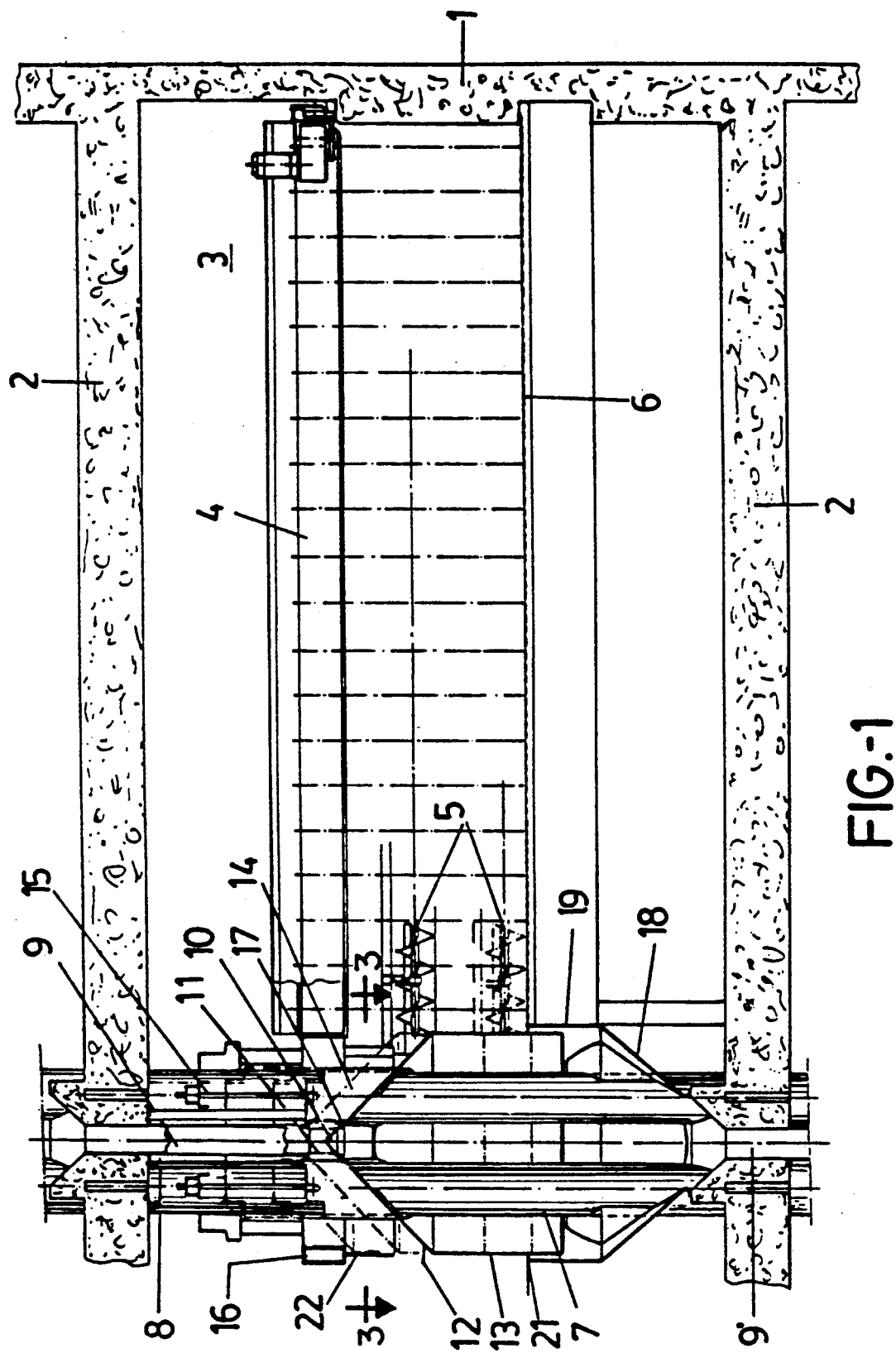
FIG. 1. shows a view in side elevation and in partial cross-section of a floorage area or floor of a tower-type malthouse equipped with the system for decanting materials which constitutes the subject of the present invention, in which the mechanisms constituting the system also appear diametrically sectioned and the machine-arm in front view.

On regarding these figures and, more particularly FIG. 1, it can be appreciated how the advocated system for decanting material is applicable to tower-type malthouses in which, inside a cylindrical tower (1), a plurality of flooring units (2) is installed which determine floors or superposed floorage areas (3) which, from above to below, will be intended for the steeping, the germination and the roasting of the raw material, the said raw material having to pass from some floorage areas (3) to others and being spread in each one of them with the help of a radially disposed machine-arm (4) which includes a worm or endless belt (5), similarly disposed radially, which is equally operative for the initial spreading of the product over the entire working surface (6) of the floorage area (3) as for its later collection or drawing in towards the centre of the said floorage area and passing to a lower floorage area.

On the basis of this basic and conventional construction the system advocated has characteristics which are centered on the fact that the conventional column on which the machine-arm (4) rotates and which in addition constitutes the physical support for the flooring units (2) is constructed as a multi-part column, based on several independent columns (7—7'), four in the practical embodiment represented in the figures, but whose number it will be possible to vary upwards or downwards without affecting the essential nature of the invention, in such a way that in any event and between the said individual columns (7—7') an obviously vertical, empty space (8) is created, coincident with the imaginary axis of the multi-part column as a whole.

Figure 5:
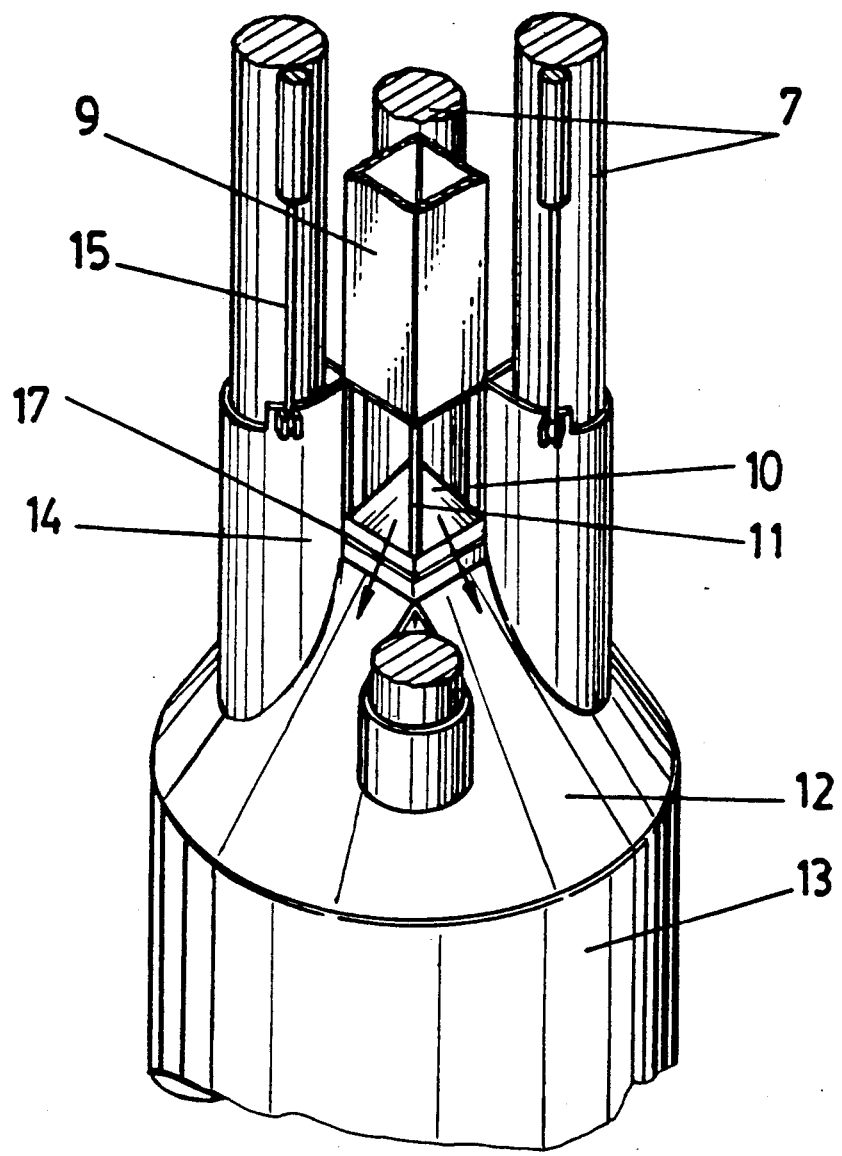
FIG. 5. shows, finally, a perspective and suitably sectioned enlarged detail of the mechanism for channelling the product in position for passing to the said floorage area in which it is to be found located.

Installed in this vertical housing (8) is a duct (9) for dropping the product from the upper floor and which consequently crosses the likewise upper flooring unit (2) of the floorage area (3), as is seen in FIG. 1, the said duct (9) being finished off, through its lower end, considerably above the loading surface (6) of the floorage area (3), in a deflector (10) which takes on the shape of a quadrangular pyramid and which is joined to the duct (9) by lateral arms (11) which determines wide windows for the lateral exit of the product, as is seen particularly in FIG. 5.

A plug (12) in which two sections are established, one upper and approximately conical which corresponds with the said reference (12) and another, cylindrical, lower (13), cooperates with the deflector (10), the said plug (12-13) being crossed by the columns (7) and being extended, correspondingly with the said columns (7), in ascending collars (14) which pass beyond the upper edge of the lateral windows defined by the arms (11) of the deflector (10) and which each receive, through the upper end thereof, the actuation of elevating mechanisms (15) of any conventional type, such as hydraulic or pneumatic cylinders, worms, racks, etc., situated in the spaces between columns (7) outside the central duct (9) and inside the ring (16) suitably mounted on the multi-part column and which is integral with the machine-arm (4).

The plug (12-13), suitably guided in a vertical direction on the columns (7) and driven by the elevators (15), is able to take up three positions. In one position the deflector (10) fits into an orifice (17) effectively made in the vertex of the conical section (12) thereof and coinciding in shape and size with the base of the deflector (10); in this position the product which drops through the duct (9) dispenses laterally and across the conical section (12) of the plug towards the said floorage area (3) in which the mechanism is located, the product being spread over the entire working surface (6) of the said floorage area (3) by means of the worm (5) which, linked up to the machine-arm (4), will be raised as the filling of the said floorage area takes place as the arrows in the left-hand illustration in FIG. 4 show. Another position is that represented in the center of FIG. 4. On raising the plug (12-13) the lateral windows situated immediately above the deflector (10) will remain housed in the hollow interior of the plug (12-13); in this position the product will not only pass to the floorate area (3) in which the mechanism is located, but will drop axially through the said plug so as to reach the duct (9') which connects this floorage area with that immediately below.

Corresponding with this duct (9') the system includes an inverted cone (18) which dispenses towards the said duct (9') and which extends upwards in a cylindrical section (19) telescopically mounted on the cylindrical section (13) of the plug in such a way that, if the said plug ascends even further, as far as the third position shown in broken lines in FIG. 1 and in more detail in the right-hand illustration in FIG. 4, the cylindrical sections (13) and (19) become uncoupled, defining a perimetric aperture (20) for dropping the product stored in the floorage area (3) towards any of the lower floorage areas, to which effect the mouth (21) of the said cylindrical section (19) of the lower inverted cone remains positioned in the same plane as the working surface of the floorage area (3).

In this position, that shown in the right-hand illustration in FIG. 4, the grain which is drawn in by the endless belt (5) no longer bears against the cylindrical section (13) of the plug, as in previous cases, but has direct access to the inverted cone (18) through the perimetric window (20) so as to drop to the floorage area immediately below, or to another, depending on the position which the mechanism of the said lower floorage area occupies, in particular depending on the position which its plug occupies.

Figure 2:
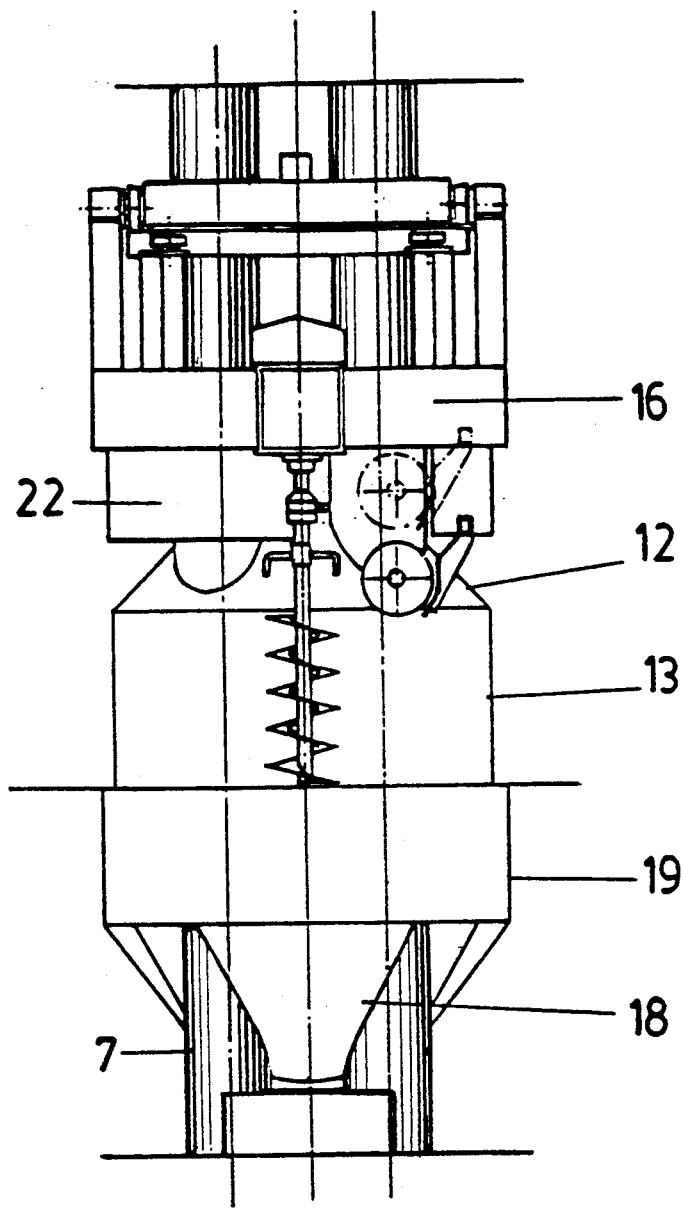
FIG. 2. shows the same mechanisms as the previous figure, now seen from outside and with the machine-arm in section.
Figure 3:
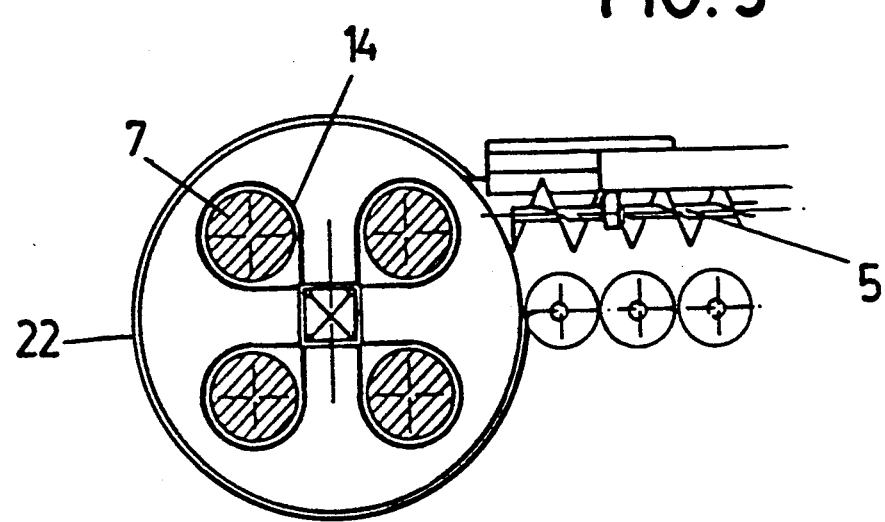
FIG. 3. shows a transverse cross-section of the mechanism along the line 3—3 of FIG. 1.

Finally, it only remains to point out that the rotation ring (16) for the machine-arm (4) is provided with a lower skirt (22), operating as a load limiter, a skirt which, as is seen particularly in FIG. 2, is interrupted in correspondence with the siting zone of the machine-arm (4) with the purpose that the worm (5) of the latter may be raised above the lower edge of this skirt.

Now, according to the construction described, there are not further moving elements in the system other than the conical-cylindrical plug (12-13) which is able to take up three positions, a lower limiting position corresponding to the product loading in the same floorage area in which the mechanism is located, an intermediate position in which the said product passes to any of the lower floorate areas and an upper end position corresponding to the unloading of the floorage area in which the mechanism is located, in accordance with the three illustrations shown in FIG. 4.

It is not considered necessary to make this description more extensive in order for anybody skilled in the art to understand the scope of the invention and the advantages which derive from same.

The materials, form, size and arrangement of the elements will be susceptible to variation, only insofar as this does not entail any alteration in the essential nature of the invention.

The terms in which this document has been described are always to be taken in a wide and nonlimiting sense.

We claim:

1. In a tower-type malthouse having floorage areas for steeping, germination and/or roasting of a product; each of said floorage areas having a working surface; an arm rotatably mounted for movement about the axis of said malthouse; and means carried by said arm for dispensing or performing selected operations on the product within a floorage area; wherein the improvement comprises:
    a plurality of separate vertical columns extending longitudinally within said malthouse, said columns disposed about the axis of said malthouse and collectively defining therebetween a central space extending vertically through the various floorage areas of said malthouse for passage of the product therethrough;
    means defining passageways extending radially from said central space to provide communication between said space and the various floorage areas; and
    means for opening and closing said passageways.

2. The tower-type malthouse of claim 1, wherein said means defining said passageways comprise a duct disposed in said central space in each of said floorage areas for passage of the product therethrough; said duct having sidewalls, an upper portion and a lower portion; said lower duct portion having a deflector surface spaced from said sidewalls and connected thereto by corner posts to define therebetween said radially extending passageways; and said upper duct portion being in communication with an upper floorage area.

3. The tower-type malthouse of claim 2, wherein said means for opening and closing said passageways comprise a movable plug disposed for axial movement along said plurality of columns from a lower position to an intermediate position and to an upper position; said plug having an upper conically-shaped section formed with a central opening configured to receive the lower portion of said duct; and elevator means for selectively moving said plug to one of said lower, intermediate or upper positions; whereby when said plug is moved to its lower position, said dispensing means is operatively associated with the conically-shaped section of said plug, and the deflector surface of said duct is positioned adjacent to and in substantial alignment with the conically-shaped section of said plug to permit passage of the product from said duct to the working surface of the associated floorage area via said plug.

4. The tower-shape malthouse of claim 3, wherein said plug has a passageway therethrough; the upper end of said passageway being in communication with the central opening of said plug and the lower end of said passageway being in communication with an outlet conduit of said plug; said outlet conduit being in communication with a lower floorage area; whereby when said plug is moved to its intermediate position, the deflector surface and the radially extending passageways of said duct are received within the central opening of said plug and are disposed in communication with the passageway of said plug to permit passage of the product from said duct to the lower floorage area via said plug.

5. The tower-shape malthouse of claim 3, further comprising a funnel-shaped member fixedly disposed in said central space about said plurality of columns; said funnel-shape member resembling an inverted cone having an enlarged upper cylindrical section positioned beneath said plug and a lower discharge conduit in communication with a lower floorage area; said cylindrical section defining a mouth opening of said funnel-shaped member; said plug having a body portion extending downwardly from its conically-shaped section and configured to be received within the cylindrical section of said funnel-shaped member when said plug is moved to its lower and intermediate positions; whereby when said plug is moved to its upper position, said plug is spaced away from said funnel-shaped member to provide communication between the mouth opening of said funnel-shaped member and the associated floorage area, and said dispensing means is operatively associated with the mouth opening of said funnel-shaped member to dispense the product from the working surface of the associated floorage area to the lower floorage area via said funnel-shaped member.

6. The tower-shape malthouse of claim 1, further comprising a ring rotatably mounted to said plurality of vertical columns for movement about the axis of said malthouse; said arm being connected to said ring for rotation therewith; and said ring having a downwardly projecting skirt formed with a slotted opening therein; said dispensing means being raised above the working surface of the associated floorage area as the product dispensed thereon fills said floorage area; the slotted opening of said ring being located to accommodate the raised movement of said dispensing means.

7. The tower-shaped malthouse of claim 3, further comprising a ring rotatably mounted to said plurality of vertical columns for movement about the axis of said malthouse; said arm being connected to said ring for rotation therewith; and said ring having a downwardly projecting skirt formed with a slotted opening therein; said dispensing means being raised above the working surface of the associated floorage area as the product dispensed thereon fills said floorage area; the slotted opening of said ring being located to accommodate the raised movement of said dispensing means.

8. In a tower-type malthouse having floorage areas for steeping, germination and/or roasting of a product; each of said floorage areas having a working surface; an arm rotatably mounted for movement about the axis of said malthouse; and means carried by said arm for dispensing or performing selected operations on the product within a floorage area; wherein the improvement comprises;
    a plurality of separate vertical columns extending longitudinally within said malthouse, said columns disposed about the axis of said malthouse and collectively defining therebetween a central space extending through the various floorage areas of said malthouse;

a duct disposed in said central space in each of said floorage areas for passage of the product therethrough, said duct having sidewalls, an upper portion and a lower portion;

said lower duct portion having a deflector surface spaced from said sidewalls and connected thereto by corner posts to define therebetween passageways extending radially from said central space to provide communication between said space and the various floorage areas;

said upper duct portion being in communication with an upper floorage area;

a movable plug disposed for axial movement along said plurality of columns from a lower position to an intermediate position and to an upper position, the position of said plug serving to open or close said radially extending passageways;

said plug having an upper conically-shaped section and a body portion extending downwardly therefrom, said upper conically-shaped section formed with a central opening configured to receive the lower portion of said duct;

said plug further having a passageway therethrough, the upper end of said passageway being in communication with the central opening of said plug;

a funnel-shaped member fixedly disposed in said central space about said plurality of columns, said member resembling an inverted cone having an enlarged upper cylindrical section positioned beneath said plug and a lower discharge conduit in communication with a lower floorage area, and said cylindrical section defining a mouth opening of said member; and elevator means for selectively moving said plug to one of its lower, intermediate or upper positions; whereby:

(1) when said plug is moved to its lower position, the body portion of said plug is received within the cylindrical section of said funnel-shaped member, said dispensing means is operatively associated with the conically-shaped section of said plug, and said deflector surface of said duct is positioned adjacent to and in substantial alignment with the conically-shaped section of said plug to permit passage of the product from said duct to the working surface of the associated floorage area via said plug;

(2) when said plug is moved to its intermediate position, the body portion of said plug remains received within the cylindrical section of said funnel-shaped member, the lower end of said plug passageway is in communication with the lower discharge conduit of said funnel-shaped member, and the deflector surface and the radially extending passageways of said duct are received within the central opening of said plug and are disposed in communication with the passageway through said plug to permit passage of the product from said duct to the lower floorage area via said plug; and (3) when said plug is moved to its upper position, said plug is spaced away from said funnel-shaped member to provide communication between the mouth opening of said funnel-shaped member and the associated floorage area, and said dispensing means is operatively associated with the mouth opening of said funnel-shaped member to dispense the product from the working surface of the associated floorage area to the lower floorage area via said funnel-shaped member.

9. The tower-shape malthouse of claim 8, further comprising a ring rotatably mounted to said plurality of vertical columns for movement about the axis of said malthouse; said arm being connected to said ring for rotation therewith; and said ring having a downwardly projecting skirt formed with a slotted opening therein; said dispensing means being raised above the working surface of the associated floorage area as the product dispensed thereon fills said floorage area; the slotted opening of said ring being located to accommodate the raised movement of said dispensing means.

* * * * *